United States Patent

Smith et al.

[15] 3,661,171
[45] May 9, 1972

[54] BUTTERFLY VALVE

[72] Inventors: Russell G. Smith; William G. Sonderman; Paul D. Templin, all of Cincinnati, Ohio

[73] Assignee: Xomox Corporation, Cincinnati, Ohio

[22] Filed: May 12, 1970

[21] Appl. No.: 36,643

[52] U.S. Cl. ............................................. 137/375
[51] Int. Cl. ....................................... F16k 1/226
[58] Field of Search ................... 137/375; 251/306

[56] References Cited

UNITED STATES PATENTS

| | | |
|---|---|---|
| 2,847,181 | 8/1958 | Muller .................................. 251/306 |
| 3,100,500 | 8/1963 | Stillwagon ....................... 251/306 X |
| 3,227,174 | 1/1966 | Yost ..................................... 137/375 |
| 3,346,005 | 10/1967 | Hanssen ............................... 137/375 |
| 3,425,439 | 2/1969 | Duffey et al. ......................... 137/375 |

*Primary Examiner*—Henry T. Klinksiek
*Attorney*—J. Warren Kinney, Jr.

[57] ABSTRACT

A pre-formed flexible protective liner characterized by its durability, resistance to corrosion, and inherent self-lubricating qualities, is disposed between the body bore and the valving member of a butterfly valve; and resilient back-up means are provided between the body bore and liner for yieldably expanding the liner into fluid-tight sealing relationship with the valving member periphery when in closed position.

23 Claims, 9 Drawing Figures

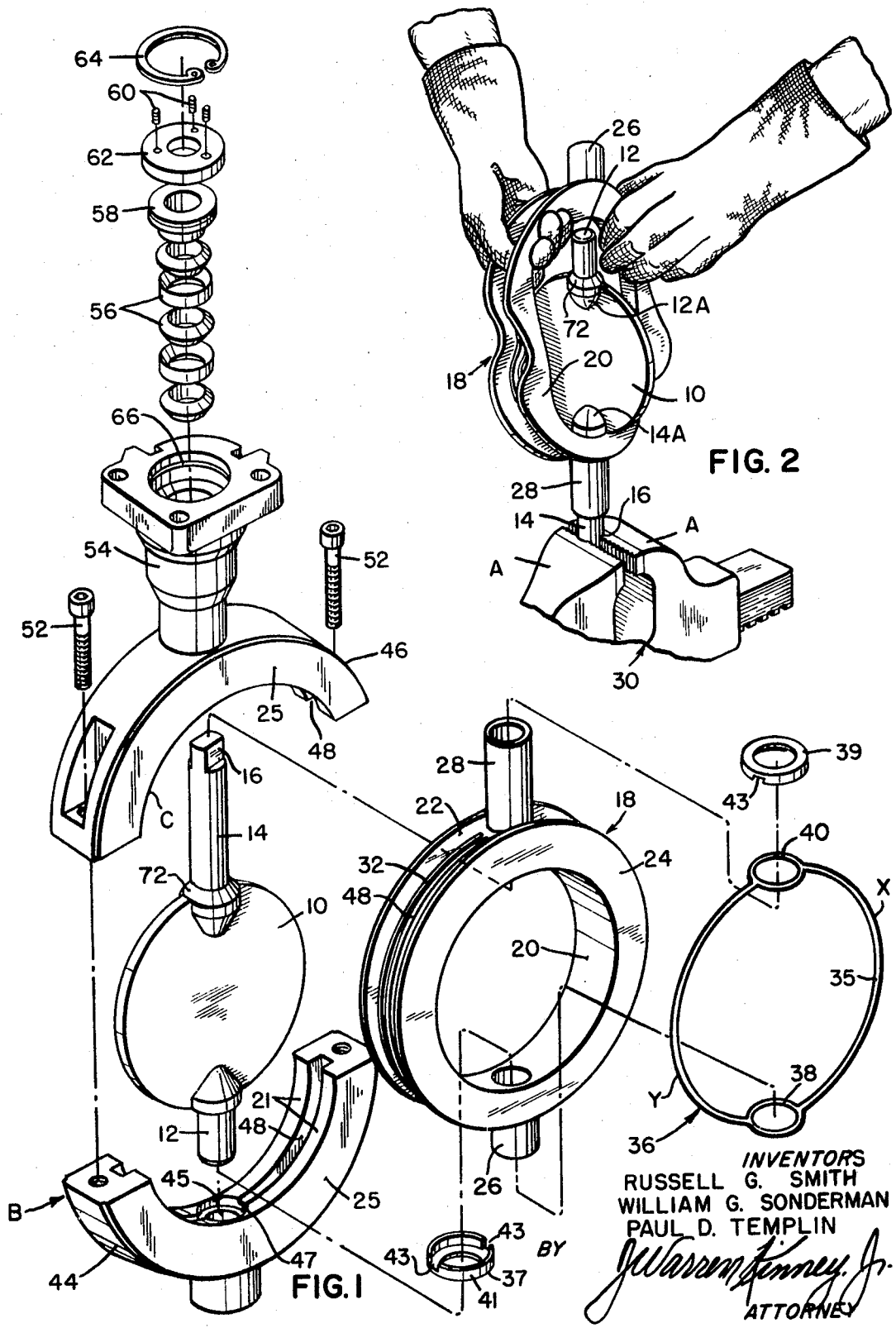

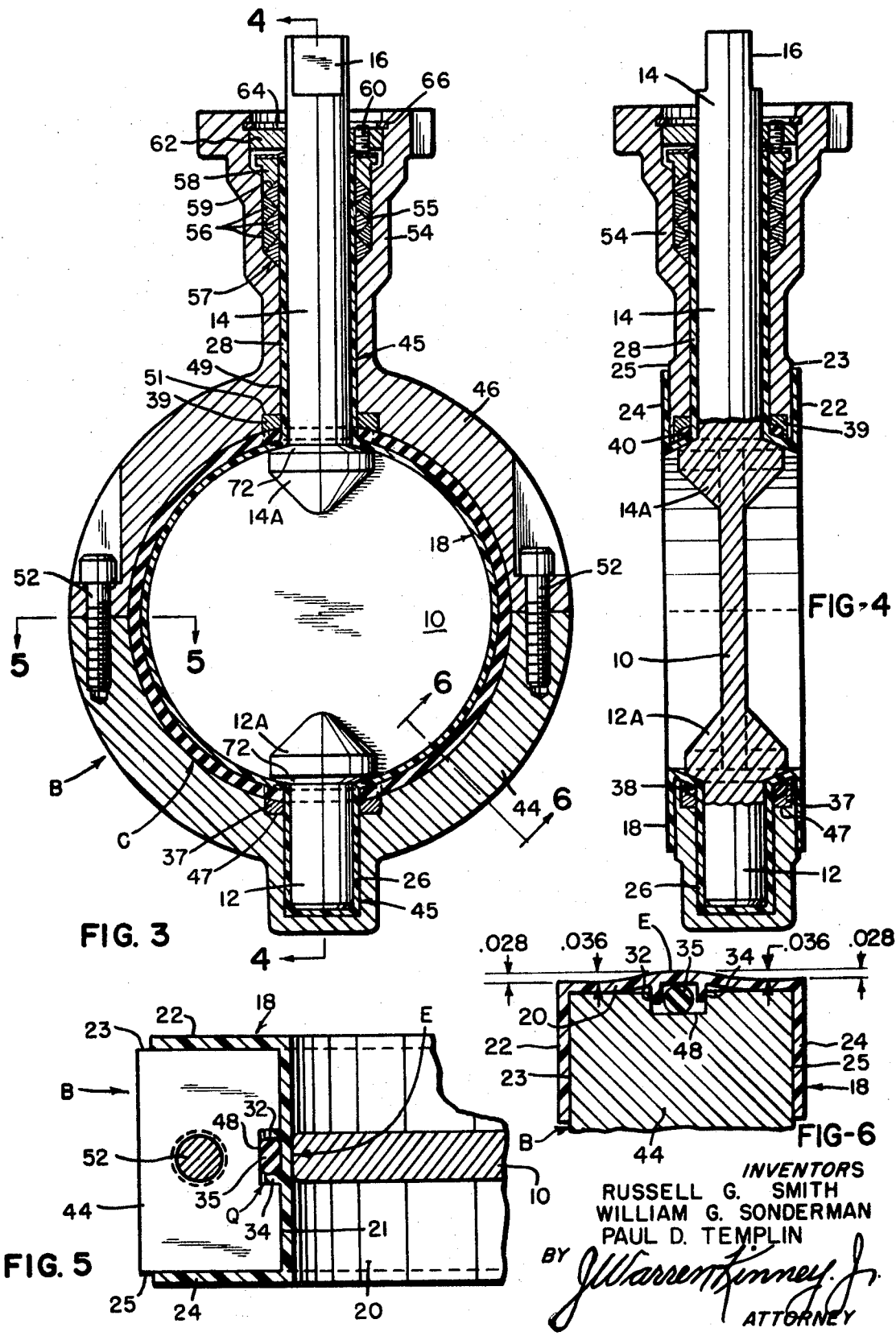

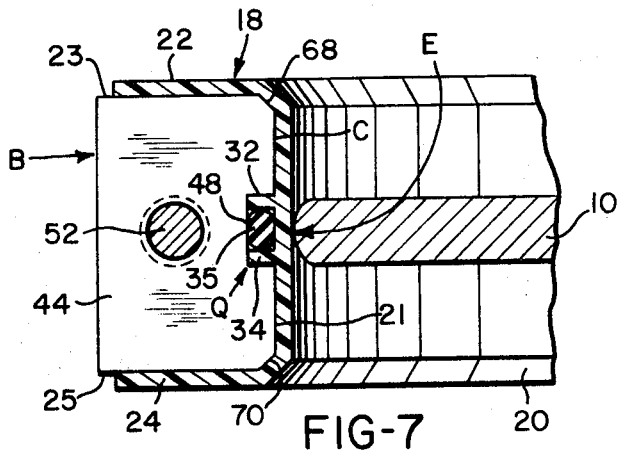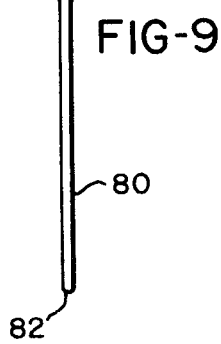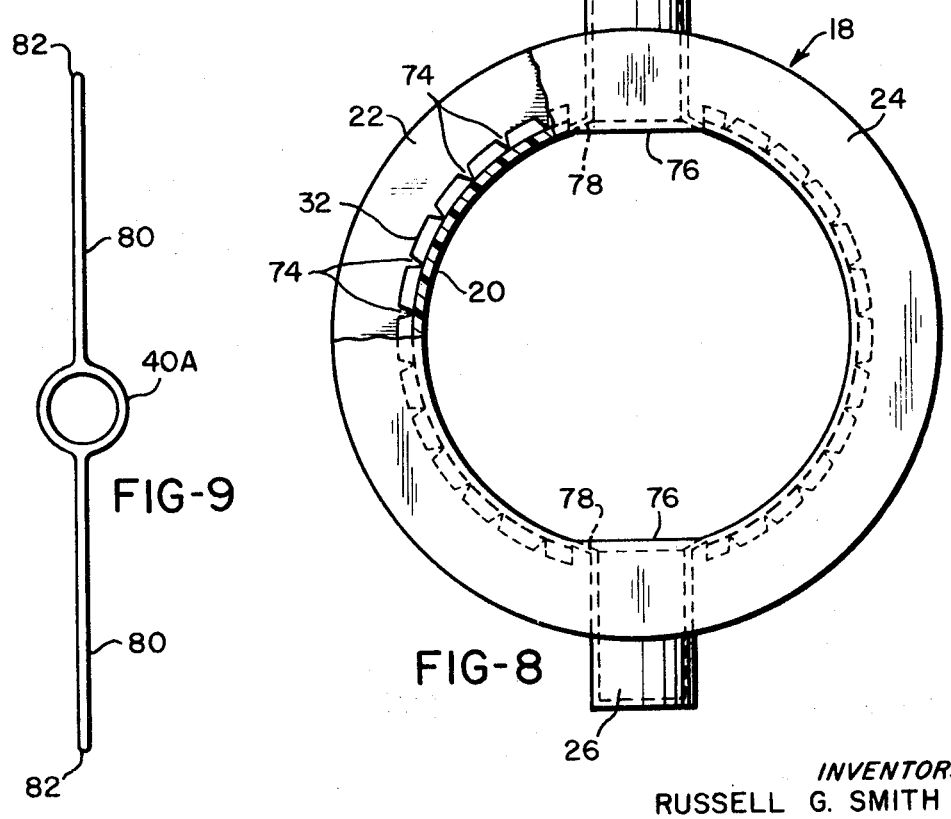

BUTTERFLY VALVE

In butterfly valves, it is generally difficult to obtain a fluid-tight seal when the valve is in the closed position. The present invention satisfactorily overcomes the sealing problem by providing a unique valve structure in which an effective fluid seal is obtained between the valving member and the structure which it engages for sealing purposes, without the need of a relatively large force acting on the valving member. The present invention utilizes a one-piece pre-formed liner between the valving member and the body of a butterfly valve, with a resilient back-up member or expander disposed between the liner and the body. The back-up member exerts a yielding force against the liner to enforce formation of a fluid seal between the liner and the valving member when the valve is in the closed position.

Since the valving member of a butterfly valve is pivotally mounted in the body or housing for movement between open and closed positions, fluid may tend to leak past the pivotal mounting means. Furthermore, in order to actuate the valving member between open and closed positions, it is necessary that a stem of the valving member extend exteriorly of the valve body, with the risk of permitting fluid to escape along the stem from the passage or chamber of the valve body or housing.

The present invention satisfactorily overcomes the foregoing problems by utilizing the one-piece pre-formed cast liner which includes a first portion or cylindrical cup portion which completely encloses the valve's journal, and a second cylindrical portion which is open-ended and surrounds the major portion of its operating stem. The aforesaid resilient back-up member or expander in one form may include a first circular portion surrounding that portion of the liner which completely encloses the journal, to exert a yielding force on said first portion of the liner in the area at which the journal enters the liner, to form a fluid seal therewith. Thus, even though the liner has a cup portion that completely envelops the journal of the valving member to prevent any fluid leakage from the valve body irrespective of the position of the valve, the aforesaid circular portion of the expander acts to prevent any fluid, and particularly any corrosive fluid, from leaking into the portion of the liner that completely envelops the journal.

The resilient expander or back-up member may include also a second circular portion, which is disposed diametrically opposite the first circular portion, and is positioned in surrounding relation to said second cylindrical portion of the liner that surrounds the operating stem. The second circular portion of the resilient expander is disposed around the second cylindrical portion of the liner in the area in which the stem enters the open-ended cylindrical portion of the liner, to exert a force on said second cylindrical portion of the liner. This also serves to prevent any fluid leakage between the stem and the surrounding cylindrical portion of the liner irrespective of the position of the valving member. Said expander or back-up member may be formed as a one-piece element, or it may be produced as a two-piece component, as will be explained.

The present invention also employs highly efficient primary sealing means between the valve body and the portion of the liner that surrounds the operating stem. This forms an additional fluid seal around the stem to prevent any fluid from escaping along the stem to the exterior of the body. Such escaping fluid is often corrosive, and capable of severely damaging the valve body and accessory parts.

When utilizing a butterfly valve in a piping arrangement, for example, it is normally necessary to employ some type of fluid seal between the contacting end surfaces of each pipe and the intervening valve body or housing, to prevent fluid leakage between each of the pipes and the valve body or housing. The present invention effectively overcomes this problem by providing the one-piece pre-formed liner with a pair of annular flanges on opposite sides thereof which overlie opposite sides of the valve body or housing. Thus, when a pipe of the piping system is connected to one side of the valve body, one of the annular flanges of the liner is disposed between the pipe and the body to form a fluid seal. The other of the annular flanges of the liner is disposed between the other side of the body and another pipe of the piping system to form a fluid seal between the pipe and the body.

The present invention also contemplates a unique method of assembling the valve structure of the present invention. Thus, by selecting the liner of a material that may be made temporarily pliable at a relatively high temperature, the liner may be assembled on the valving member so as to have a closed-ended cylindrical cup portion which completely surrounds or encloses the journal of the valving member, and another open-ended cylindrical portion which surrounds the major length of the operating stem of the valving member.

The present invention is directed to the provision of a butterfly valve which has a corrosion-proof, pre-formed liner yieldingly engageable by the perimeter of the valving member for providing a fluid-tight shut-off when the valve is in closed position.

Another object of the invention is to provide a butterfly valve having the herein-above described characteristics and which will not only provide but maintain a fluid tight shut-off condition even during those periods of time when the valve is subjected to temperature variations.

Still another object of the invention is to provide a butterfly valve having a pre-formed liner fabricated from FEP (fluoronated ethylenepropylene), which is not noticeably resilient but which is backed up with a resilient, easily replaceable back-up member or expander of special configuration which imparts an operative resiliency to the pre-formed liner.

Still another object of the invention is to provide a butterfly valve having a pre-formed liner and a resilient back-up member each of which may be replaced and renewed in the field without requiring that the valve be returned to the manufacturer for replacement.

A further object of the invention is to provide a butterfly valve, the operating stem of which is provided with a multiple seal arrangement of such a nature as to effectively eliminate any external leakage around the stem.

The present invention further contemplates a unique method of assembling the valve structure of the present invention.

These and other objects are attained by the means described herein and disclosed in the accompanying drawings, in which:

FIG. 1 is an exploded perspective view of the various component elements of a butterfly valve structure embodying the teachings of the present invention, prior to assembly thereof.

FIG. 2 is a perspective view of the pre-formed liner of the present invention in the process of being associated with the valving member of the valve.

FIG. 3 is a sectional view of the valve assembly with the valving member in closed position.

FIG. 4 is a sectional view taken on line 4—4 of FIG. 3.

FIG. 5 is a sectional view, on an enlarged scale, partly in plan, taken along line 5—5 of FIG. 3.

FIG. 6 is an enlarged fragmental cross section taken on line 6—6 of FIG. 3, with the valving member omitted.

FIG. 7 is a view similar to FIG. 5, showing a modification.

FIG. 8 is a front elevation of a pre-formed liner slightly modified, with a portion thereof broken away.

FIG. 9 is a reduced scale plan view of a resilient back-up member or expander modified as to design.

With reference now to the drawings, the numeral 10 denotes a valving member in the form of a circular substantially flat plate or disc, having a cylindrical stud shaft or journal 12 formed integrally therewith and extending from one side thereof, and an operating stem 14 integral with and extending coaxially from the diametrically opposite side thereof to provide pivotal mounting means for the valving member in body B. The outer end of stem 14 may terminate in flat surfaces 16 to accommodate a wrench, handle, or other means by which a turning torque may be applied to the valving member for moving or rotating it between its open and closed positions. The valving member may be formed of any suitable metal or substance resistive to corrosion and wear.

A one-piece pre-formed liner 18 having an axial, substantially cylindrical wide central portion 20 and annular side flanges 22 and 24, is disposed in overlapping or lining relationship with the axial cylindrical wide face 21 and the flanking side faces 23 and 25, respectively, of the valve body B.

The pre-formed liner includes an integrally formed first, closed-ended hollow, cup-like cylindrical portion 26 and a second, open-ended hollow cylindrical portion 28 which project radially and coaxially in opposite directions from central cylindrical portion 20.

In the preferred embodiment of the invention, the pre-formed liner 18 is fabricated from FEP (fluoronated ethylenepropylene), by a transfer molding process. FEP is characterized by its high resistance to corrosion, its impermeability, and by its inherent self-lubricating qualities. When the pre-formed liner 18 of FIGS. 1 and 8 is initially removed, while hot from its mold, or when thereafter a cooled liner is heated to temperatures of 300° F or greater for a brief period of time, the material will become soft and pliable thereby enabling it to be deformed and distorted as illustrated in FIG. 2, for facilitating application thereof to the valving member 10, as follows.

When the liner is at a temperature high enough to render it readily pliable, the open-ended cylindrical portion 28 may be passed over stem 14 of the valving member 10 after which the valving member may be secured in an inverted, upright position by clamping flats 16 between the jaws A of a vise 30 or the like, after which the cylindrical portion 20 may be distorted by the application of an upward force sufficient to locate the closed-ended hollow cylindrical portion 26 above journal 12 for permitting journal 12 to be received within portion 26. It will be noted that the plane of valving member 10 is disposed at substantial right angles to the mean plane of the liner during the process of associating the liner with the valving member, as in FIG. 2. After stud 12 enters cup 26, the liner will be free to resume its substantially cylindrical shape, as at 18, FIG. 1. Normally, the liner is allowed to cool with valving member 10 in line with the mean plane of the liner.

The body or housing B includes a lower arcuate portion 44 and an upper arcuate portion 46, which are adapted to be securely though releasably fastened to one another by means of any required number of screws or the like 52, to form a valve body having a passageway or bore C therethrough.

The upper portion 46 of body member B includes an upstanding, open-ended boss or sleeve portion 54 having an opening therethrough to receive the open-ended cylindrical portion 28 of the liner, and stem 14 which projects upwardly through portion 28. The stem is rotatable in the cylindrical portion 28 of the liner.

As clearly illustrated in FIGS. 3 and 4, the upper end of stem 14 projects outwardly beyond the upper end of sleeve portion 54, whereas the cylindrical liner portion 28 terminates adjacent to but inwardly from the outer end thereof.

The lower portion 44 of the body member B includes a closed-ended boss, socket or bore 45. The first, closed-ended, hollow cylindrical cup portion 26 of the liner with its inserted rotatable valve member journal 12, is received within said closed-ended bore or socket 45.

With reference to FIG. 5, it will be noted that the main cylindrical central portion 20 of the pre-formed liner 18 is provided with a pair of radially outwardly projecting, integral, laterally spaced ribs 32 and 34 which almost completely circumscribe portion 20. Continuity of the ribs is interrupted by the cylindrical portions 26 and 28, (FIG. 1). The ribs 32 and 34 define upon the surface 21 of body member B, a centrally disposed groove 48, the depth of which (as measured from surface 21) is greater than the height of ribs 32 and 34 by an amount sufficient to provide a clearance in the neighborhood of one thirty-second inch at Q, (FIG. 5). The width of groove 48 is substantially equal to the lateral distance between the outer side surfaces of ribs 32 and 34 whereby said ribs will be snugly received within said groove.

As shown in FIG. 1, a resilient pressure ring or expander 36 is provided, which comprises a substantially circular first portion or major portion 35, which is formed integral with a second, circular minor portion 38 and a third circular minor portion 40, wherein the second and third circular portions are diametrically disposed relative to first circular portion 35. Uniformly satisfactory results have been obtained in those instances wherein pressure member 36 has been fabricated from silicone rubber or a resilient material similar to that from which O-rings are generally fabricated.

The resilient pressure ring or expander is associated with the pre-formed liner so that first portion 35 is received between ribs 32 and 34 in the body groove 48, FIG. 6. The second and third circular minor portions 38 and 40 circumscribe the cylindrical portions 26 and 28 respectively, of the liner.

After the pressure ring or expander 36 has been thusly applied to the pre-formed liner, the liner and valving member 10 may be associated with the upper and lower body portions 46 and 44 which will result in portions 35, 38 and 40 of the expander being in position for continuously directing a yielding force against localized portions of the liner. Thus, as in FIG. 6, the portion 35 of the expander rests within groove 48 and between ribs 32 and 34, to normally distend the liner as at E. The distention at E largely disappears when, as in FIG. 5, the valving member 10 is rotated into position for flattening the portion 35 of the expander.

The flattened condition of the expander is shown also in FIG. 7, wherein is suggested also a rounding of the valving member perimeter to impose at E a reduction of contact area between the liner and the valving member perimeter. This reduction of contact area is feasible in many valve installations, and serves to extend the useful life of the liner and to reduce the torque required for rotating the valving member. FIG. 7 suggests also as modification, chamfering of the valve body passageway bore at 68 and 70, the chamfers being continuous circumferentially of said bore. The liner contour may be modified in correspondency with the chamfers, to insure accurate fitting of the liner to the valve body as indicated.

The construction according to FIG. 7 minimizes the possibility of the liner material being eventually stretched and displaced by differential thermal expansion and contraction with resultant objectionable build-up of liner material at one or both ends of bore C tending to impede flow of material through the valve.

As above noted, the minor circular portions 38 and 40 of the expander will assume positions of encirclement about the cylindrical portions 26 and 28, respectively, of the liner, closely adjacent to the bases or inner ends of said cylindrical portions, where sealing against leakage is especially desired.

Sealing about the cylindrical portions 26 and 28 of the liner is enhanced by incorporating at these locations a pair of expander retaining rings or cups 37 and 39. The rings 37 and 39 are identical, and consist of a rigid centrally apertured annular cup for snugly confining one of the minor circular portions such as 38 or 40, of the large pressure ring. The cylindrical wall 41 of each cup is notched at 43, 43, at opposite ends of a diameter, to accommodate the junction points where the circular portions 38 and 40 meet the major circular portion 35 of the pressure ring. Notches 43, 43 approximate in depth the interior depth dimension of the cup.

As will be understood, the retaining ring 37 (FIG. 4), surrounds the cylindrical portion 26 of the liner, whereas ring 39 surrounds the opposite cylindrical portion 28 thereof. Ring 37 rests snugly in a counterbore 47 of bore 45, (FIG. 1), which intersects the annular groove 48. In like manner, retaining ring 39 rests in a counterbore 51 (FIG. 3) of bore 49, to support and confine the minor circular portion 40 of the pressure ring. The retaining rings 37 and 39 are formed of a rigid material.

When the valving member 10 has been rotated to the fully closed position illustrated in FIGS. 3, 5 and 7, the outer peripheral surface of the valving member will engage the distended central portion E of the liner which overlies and is distended by the major circular portion 35 of the expander or pressure ring. In this manner a positive, resilient sealing relationship is established which results in a long lasting highly efficient seal between the adjacent surfaces of the valving member and the pre-formed liner, whenever the valving member has been rotated to a fully closed position.

When the valving member or disc 10 is not in engagement with the central axial portion 20 of the liner 18, the first circular portion 35 of the resilient pressure ring 36 distends the central part of the liner 18 inwardly as shown in FIG. 6. This reduces the inner diameter of the port portion of the liner 18.

As shown in FIG. 6, force applied by the first or major portion 35 of the resilient pressure ring 36 normally moves the central part of the liner portion 20 outwardly beyond the undistended edges of the liner at the side flanges 22 and 24. The dimensions indicated on FIG. 6, while not critical, have produced uniformly satisfactory results in valves which have been subjected to laboratory testing.

By thus normally elevating the central portion E of the liner the outer edge or circumference of the valving member 10 is enabled to pivotally move inwardly of the outer side edge of the liner before it engages the inwardly projecting portion E of the liner 18. As a result of said relationship, an increased turning force on the valving member 10 to overcome the force of portion 35 of the pressure ring 36 is not necessary until it engages the elevated portion of the liner, at which time the valving member 10 is almost in its closed position. Furthermore, due to the curvature of the portion 20 because of the resilient force of the first portion 35 of the ring 36 on the portion 20 of the liner 18, the turning force to close the valving member 10 is an increasing force.

As shown in FIG. 6, the ribs 32 and 34 have a sufficient depth to remain in the groove 48 notwithstanding distention of the liner by the resilient pressure ring portion 36. Thus, the ribs 32 and 34 serve as a guide means to insure return of the portion 20 of the liner 18 to the position of FIG. 5 when the valving member 10 is moved to closed position.

As shown in FIG. 6, the first portion 35 of the resilient pressure ring 36 returns to its original circular cross section formation when the valving member 10 is open. The compressed or partially flattened shape of FIG. 5 occurs when the valving member 10 is closed. As is evident, the portion 35 exerts a force only on the middle area of liner 20 between the ribs 32 and 34, and not on the ribs themselves. Therefore, there is no force exerted by the portion 35 of the pressure ring 36 capable of pushing the ribs 32 and 34 sidewise out of the groove 48.

As clearly illustrated in FIG. 4 the minor second and third circular portions 38 and 40 of the pressure ring encircle and resiliently support the innermost ends of tubular portions 26 and 28 of the liner for providing a highly effective, firm, leak-proof sealing of said tubular portions against the annular bearing surfaces 72, 72 of hubs 12A and 14A located at journal 12 and stem 14 of valving member 10.

Attention is now directed to FIG. 8, which illustrates a slight modification of the liner 18 previously described. The FIG. 8 liner carries the same cylindrical portions 26 and 28, and the spaced ribs 32 and 34, but in accordance with FIG. 8 the ribs 32 and 34 are weakened at intervals by slots or notches 74 extending radially inwardly to the central axial portion 20 of the liner. By so weakening the ribs, there is avoided an undesired tendency for the ribs to constrict and interfere with smooth and uniform distention of the liner by resilient member 35, (see FIG. 6). It is found that notching the ribs at close intervals results in formation of a better seat for valving member 10, while at the same time providing sufficient lateral support for member 35. The slotting or notching is applicable as well to the ribs of the liner of FIGS. 1 through 6, and FIG. 7.

Another modification depicted by FIG. 8 involves providing flat areas 76, 76 upon liner 18, where the cylindrical portions 26 and 28 meet the main central portion 20 of the liner, this being for the purpose of facilitating formation of annular full tapered seats 78, 78 to accommodate the annular seal areas 72, 72 of the valving member hubs 12A and 14A. The flat areas 76 and the tapered seats 78 therein are formed as the liner is molded.

FIG. 9 illustrates a modification of the silicone rubber expander or back-up member 36 of FIG. 1. By comparing FIG. 1 and FIG. 9, it is apparent that two of the FIG. 9 items, which are planar, could be bent and assembled to produce one of the FIG. 1 items 36. That is, the expander of FIG. 9 comprises a single minor ring 40A corresponding to minor ring 40, and two elongage diametrically opposite major resilient arms 80, 80 having terminal ends 82, 82. The expander of FIG. 9 is a part which could be produced by severing the element 36 of FIG. 1, at the diametrically opposite locations X and Y. In practice, however, the FIG. 9 part would be most economically produced by molding in the flat, as a planar piece.

To fit the liner with a back-up member or expander such as FIG. 9 illustrates (on reduced scale), two of said members or expanders would be needed. One would be applied to each of the cylindrical portions 26 and 28, with a circular portion 40A surrounding each cylindrical portion. The resilient arms 80, 80 would be curved, and lodged in the channel between ribs 32 and 34 at opposite sides of the liner. When so positioned upon the liner, the terminal ends 82, 82 of one expander would be fitted or trimmed to abut or nearly abut the corresponding ends of the second expander, so that for all intents and purposes the assemblage would be very much like FIGS. 1 through 6, with the expander however constituted of two identical parts like FIG. 9.

The bi-part expander or back-up means above described could be applied with equal facility to the valve structure of FIGS. 1 through 6, or to the modified structures of FIGS. 7 and 8.

It is preferred, in the interest of effective sealing, that the diameter of seat 72, FIG. 3, be less than the inside diametral dimension of cup member 39. Observing this precaution serves also to avoid cutting or chafing of the liner at seat 72. The same precaution may be observed in the region of cup 37.

As illustrated in FIGS. 3 and 4, a plurality of packing members 56, which may be formed of any suitable material such as asbestos, T.F.E., or the like, are disposed in surrounding relationship with the exterior surface of cylindrical portion 28 of the pre-cast liner. Said packing members are received within an axial counterbore 55, the lower end of which terminates in a downwardly and inwardly tapered portion 57. The uppermost one of the packing members is engaged by a compression member or gland 58, the lower surface of which may be defined by an inclined surface 59 which extends upwardly from the lower, outer edge thereof.

The relationship of inclined surfaces 57 and 59 is such as to continuously exert a compressive force to and along those portions of cylindrical member 28 which are engaged by packing members 56, the force being of such magnitude as to preclude leakage or passage of fluid upwardly along stem 14. The seal here is in addition to the seal formed about the adjacent annular bearing surface 72 previously described.

An annular plate 62 having a plurality of screw-receptive internally threaded openings is securely though releasably associated with the inner, upper end of neck portion 54 of the body member by means of a snap ring 64 received within an annular groove 66. A plurality of screws 60 which engage the internally threaded openings of plate 62, are adapted to abut against the upper face of compressive force to be applied to the packing members 56.

In assembling the valve structure of the present invention, the liner member is first heated to a sufficient temperature and for a sufficient period of time to render it pliable, after which stem 14 of the valving member is introduced into and inserted through the hollow, open-ended cylindrical portion 28 thereof.

Stem 14 is then secured between jaws A—A of a vise 30 or the like to secure the valving member in the upstanding position illustrated in FIG. 2, after which a force is applied to the heat softened liner to deform it as shown in FIG. 2, whereby the closedended hollow cylindrical portion 26 may be fitted over journal 12.

Thereafter, and as the liner member cools, it will return to its initial shape as illustrated in FIGS. 1 or 8, at which time the valve member may be rotated relative to the liner between open and closed positions.

After the liner has thus been mounted on the valving member, stem 14 may be released from the vise and the resilient pressure ring or expander means may be applied. If the one-piece pressure ring is used, it may be applied, by first introducing cylindrical portions 26 and 28 of the pre-formed liner through the second and third cylindrical portions 38 and 40 of the pressure ring, after which cylindrical portion 35 may be seated within and between ribs 32 and 34 of the liner.

The cylindrical portion 26, including stud portion 12 which is housed therein, may then be introduced downwardly through retaining ring 37, into closed-ended socket or bore 45 of body B. Then the ribs 32 and 34 and portion 35 of pressure ring 36 will be received within groove 48 of the lower portion 44 of the body.

Next, the cylindrical portion 28 and stem 14 which projects upwardly through said cylindrical portion, may be introduced upwardly through retaining ring 39 and bore 49 of the upstanding portion 54 of body part 46, after which the upper and lower body portions 44 and 46 may be securely though releasably interconnected as by means of screws 52.

Packing members 56 then may be inserted into bore 50 in surrounding relation to cylindrical portion 28 of the liner member. The compression member 58 is then disposed on top of the uppermost of the packing members 56, followed by annular plate 62. Snap ring 64 then may be disposed within annular groove 66, after which screws 60 are threaded downwardly through annular plate 62 until the packing members 56 are compressed to form the desired seal between the adjacent surfaces of cylindrical portion 28, stem 14 and bore 45 of the body.

With the valve structure so assembled, it may be interposed between the ends of aligned pipes of a fluid system in which the valve is to be employed. The pipe ends may abut opposite sides of the valve body B, and be secured by conventional means, not illustrated. It will be noted that the peripheral flanges 22 and 24 of the liner member, (FIG. 4), may abut against and form effective seals with the pipe ends or connecting flanges of pipes in a pipe system.

When the valving member 10 is moved to the closed position of FIG. 5 or FIG. 7, the force exerted by the resilient back-up member or expander against the flexible central portion 20 of the liner 18 insures an effective resilient fluid seal between said valving member and the liner at E. Since this force is exerted only against the localized central portion 20 in the small area between the ribs 32 and 34, the valving member may be easily moved to the closed position.

Additionally, the force exerted by the resilient back-up member or expander against each of the ribs 32 and 34 in the closed position of the valve, holds the ribs 32 and 34 within the groove 48 in the body B. By having the ribs 32 and 34 extending from the central portion 20 of the liner 18 for a lesser distance than the depth of the groove 48, this arrangement allows the liner to be urged toward the groove 48 by the valving member 10 whenever said member is in the closed position, thus further insuring a tight fluid seal between the valving member and the liner.

Since the second or minor circular portion 38 or 40A of the back-up member or expander encircles both the cylindrical portion 26 of the liner 18 and the journal 12 of the valving member 10, the force imposed by said circular portion forms a seal between the journal 12 and the hollow cup portion 26 of the liner 18. As a result, no fluid can reach the journal 12 to initiate gumming or corrosive action at the journal. However, if any accidental leakage should occur, it would not leak exteriorly of the valve body B but would be collected within the closed cylindrical portion 26.

Since the third or minor circular portion 40 or 40A of the back-up member or expander encircles both the hollow cylindrical portion 28 of the liner 18 and the stem 14 of the valving member in the area in which the stem 14 enters the hollow cylindrical portion 28 of the liner, fluid cannot leak into the space between the hollow cylindrical portion 28 of the liner and the stem 14. If there should be any failure of said third circular portion 40 or 40A to prevent leakage along the stem 14, the packing members 56 would provide an additional fluid seal capable of preventing loss of fluid along the stem.

Therefore, the valve structure of the present invention may handle any type of chemically active fluid with minimal risk of damage due to leakage. By forming the liner 18 of a chemically inert material, there is no chemical reaction between the material of the liner and the fluid flowing through the valve.

As a modification, the sealing ring 36 (FIG. 1) may be furnished as a pre-formed curved two-piece sealing ring, as a substitute for the one-piece sealing ring shown. The two-piece sealing ring would closely resemble a one-piece ring severed at the locations X and Y. The locations X and Y are preferably, though not necessarily, equidistance from the circular portions 38 and 40.

By making the sealing ring 36 in two parts as above suggested, it may be disposed about the liner 18 without risk of stretching the sealing ring and permanently enlarging its diameter, with the result of having a crowded fitting of said ring within the groove 48. Using the two-piece sealing ring, the halves may be assembled upon liner 18 in a fully relaxed condition, with the terminal ends of the two halves in light or approximate endwise abutment, to ensure a most effective fluid-tight closing of the valve. If necessary, the free ends of the sealing ring at X and Y may be trimmed during assembly of the valve, to obtain a desired fitting thereof to the liner and the body groove 48.

Alternatively to the modification suggested above, the simplified bi-part back-up member or expander of FIG. 9 possesses considerable merit in that it may be inexpensively produced in flat or shallow molds, or by other means involving minimal fabrication expense.

What is claimed is

1. A butterfly valve structure including:
   a valve body having a port therethrough defined by an annular unyielding inner face having a groove therein and a pair of flanking side faces;
   a valving member mounted upon said body for pivotal movement in said body port between a closed position and an open position relative to said port;
   a flexible corrosion-resistant liner disposed between said member and said inner face in surrounding relationship to said port and having a pair of spaced ribs on its outer surface extending substantially around its periphery and disposed within said groove, each of said ribs extending from said liner a lesser distance than the depth of said groove;
   and resilient expander means substantially surrounding said liner and bearing upon said body, said expander means acting constantly upon a limited area of the liner to constantly exert a localized radial force upon said limited area and normally yieldingly space said liner area annularly from the inner face of the bore, into position for fluid sealing engagement by said valving member when the latter is moved to the closed position, said resilient expander means disposed within said groove and between said ribs on said liner to exert the aforesaid localized radial force on that portion of said liner which is between said ribs and in engagement with the periphery of said valving member when said member is in closed position.

2. The valve structure according to claim 1 wherein:
   said pivotal means for the valving member extends from opposite sides of said valving member into said body;
   and said liner includes protective means surrounding substantially the entire length of each of said pivotal mounting means, and wherein said resilient expander means produces a fluid tight seal between each of said protective means and each of said pivotal mounting means.

3. The valve structure according to claim 1 in which:
said pivotal mounting means for the valving member extends from opposite sides of said valving member into said body;
said resilient expander means produces a fluid seal around each of said pivotal mounting means adjacent its entrance into said body;
and wherein said resilient expander means exerts a lateral force on each of said spaced ribs.

4. The valve structure according to claim 3, wherein said resilient expander means comprises a pair of substantially identical cooperative parts, each of which parts partially surrounds said liner.

5. The valve structure according to claim 1 in which:
said pivotal mounting means for the valving member extends from opposite sides of said valving member into said body;
said resilient expander means producing a fluid seal around each of said pivotal mounting means adjacent its entrance into said body;
said resilient expander means comprising a single continuous member which has one major and two minor circular portions formed therein, one of said minor circular portions being disposed in surrounding relation to one of said pivotal mounting means and the other of said minor circular portions being disposed in surrounding relation to the other of said pivotal mounting means;
said liner having means surrounding at least the portion of each of said pivotal mounting means adjacent said valving member;
each of said minor circular portions of said resilient expander means being disposed in surrounding relation to one of said surrounding means of said liner and one of said pivotal mounting means to produce a fluid seal between each of the said pivotal mounting means and each of said surrounding means of said liner;
and wherein the major circular portion of said resilient means is disposed within said groove and between said ribs, to exert the aforesaid localized radial force on the portion of said liner which is between said ribs and in engagement with the periphery of said valving member when said member is in closed position and exerting a lateral force on each of said ribs.

6. The valve structure according to claim 5 in which:
said liner includes means completely enclosing one of said pivotal mounting means;
the other of said pivotal mounting means extends exteriorly of said body for actuation of said valving member;
and said liner includes means partially surrounding the other of said pivotal mounting means.

7. The valve structure according to claim 6, including means to form a fluid seal between said partial surrounding means of said liner and the other of said pivotal mounting means, said fluid seal forming means being disposed between said body and said liner.

8. The valve structure according to claim 5, in which:
said pivotal mounting means for the valving member includes a pair of spaced aligned bores formed in the valve body to support the valving member for rotation;
a cup-shaped retaining ring supported in each of said bores in position to accommodate the two minor circular portions of said resilient expander means;
said retaining rings each having a notched cylindrical wall and a base confining a minor circular portion aforesaid;
and said notches of the retaining rings being receptive of the junctions where the minor circular portions meet the major circular portion of said resilient expander means.

9. The valve structure according to claim 8, in which:
said annular inner face of the body port has an annular groove therein;
and the major circular portion of said resilient expander means is disposed within said groove while the retaining rings support the minor circular portions of said resilient expander means;
said notches of the retaining rings being in substantial registry with portions of said groove adjacent the body bores aforesaid.

10. The valve structure according to claim 9, in which:
said liner includes means surrounding at least a portion of each of said pivotal mounting means adjacent to said valving member;
and said minor circular portions of the resilient expander means produce a fluid tight seal between each of said surrounding means of said liner and each of said pivotal mounting means.

11. The valve structure according to claim 10, in which:
said liner has a pair of spaced ribs on its outer surface extending substantially around its periphery and disposed within said body groove, each of said ribs extending radially from said liner a lesser distance than the depth of said groove;
and the major circular portion of said resilient expander means is disposed within said body groove and between said ribs, to exert the aforesaid localized radial force on that portion of said liner which is intermediate the ribs, thereby to distend the intermediate portion of the liner into sealing engagement with the periphery of said valving member when the latter is in closed position.

12. The valve structure according to claim 9, in which:
said limited area of said liner overlies said body groove;
and the major circular portion of said resilient expander means is disposed within said body groove to exert the aforesaid constant radial localized force on said limited area of the liner.

13. The valve structure according to claim 12, in which said liner is formed of a material of the class of polytetrafluoroethylene.

14. The valve structure according to claim 12, in which said liner is formed of a material highly resistant to chemical attack and having inherent self-lubricating characteristics.

15. The valve structure according to claim 8, in which:
said liner has a pair of annular flanges on opposite sides thereof;
said annular flanges each being disposed in overlying contact with one of the flanking side faces of said body, to form fluid seals with pipes or the like between which the valve body is interposed in practice.

16. The valve structure according to claim 15, wherein said liner is preformed as a single flexible element having fluid-tight gasketing characteristics.

17. The valve structure according to claim 1, wherein said resilient expander means comprises two cooperative parts, each of which parts partially surrounds said liner.

18. A preformed, one piece flexible protective liner for the port opening, each of a pair of pivot shaft-receptive openings and body of a butterfly valve, wherein one of said shaft-receptive openings is open at its opposite ends and wherein the other of said shaft-receptive openings is closed at its outer end, said liner comprising: an annular main central portion dimensioned to line the port opening of a butterfly valve body; a pair of axially aligned integral elongate cylindrical portions extending in opposite directions radially outwardly from said main central portion dimensioned to line each of said pivot shaft-receptive openings and support opposite end portions of a pivot shaft of a butterfly valving member received therein, and wherein one of said cylindrical portions terminates in an outer closed end to form a leak-proof cup receivable within the closed-ended pivot shaft-receptive opening.

19. A liner according to claim 18, wherein the other of said cylindrical portions is open at both its ends and extends throughout substantially the entire length of said open ended pivot shaft-receptive opening.

20. A liner according to claim 18, formed of a transfer moldable material of the class of fluoronated ethylenepropylene and polytetrafluoroethylene.

21. A preformed flexible protective liner for the port opening, each of a pair of pivot-shaft-receptive openings and body of a butterfly valve, said liner comprising: an annular main central portion dimensioned to line the port opening of a butterfly valve body, said main central portion having a substantially uniform width dimension and an outer curved surface; a pair of axially aligned integral elongate cylindrical portions extending in opposite directions radially outwardly from said main central portion to line substantially the interior of each of said shaft-receptive openings and support opposite end portions of a valving member pivot shaft; resilient expander means surrounding said elongate cylindrical portions of the liner, said expander means including resilient portions overlying the outer curved surface of said main central portion from one of said cylindrical portions to the other and a track on said outer curved surface to accommodate said overlying resilient portions of the expander means, said track extending between said elongate cylindrical portions of the liner approximately midway of the width dimension of said main central portion of the liner.

22. The liner according to claim 21, wherein said track comprises a pair of spaced ribs formed integrally on the outer curved surface aforesaid, said ribs being weakened transversely at intervals along the length of the ribs for the relief of internal stresses in the liner material.

23. A preformed flexible protective liner for the port opening and body of a butterfly valve, said liner comprising: an annular main central portion dimensioned to line the port opening of a butterfly valve body, said main central portion having a substantially uniform width dimension and an outer curved surface; a pair of axially aligned integral elongate cylindrical portions extending in opposite directions radially outwardly from said main central portion to support opposite end portions of a valving member pivot shaft; a track on said outer curved surface to accommodate an expander, said track extending between said elongate cylindrical portions of the liner approximately midway of the width dimension of said main central portion of the liner, and wherein said track comprises a pair of spaced ribs formed integrally on the outer curved surface aforesaid, said ribs being structurally weakened transversely at intervals along the length of the ribs for the relief of internal stresses in the liner material.

* * * * *